G. WESTINGHOUSE, Jr.
Steam-Power Brake-Couplings.
No. 136,396.                          Patented March 4, 1873.
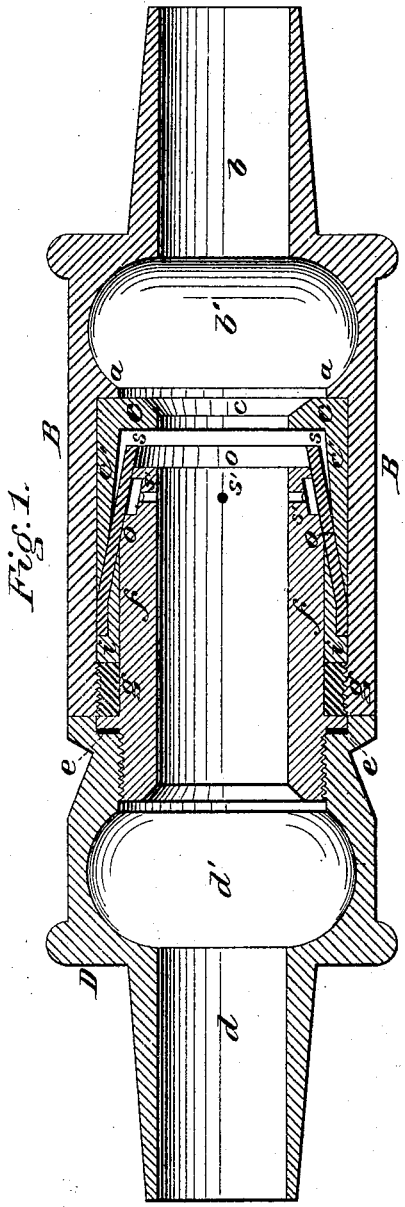
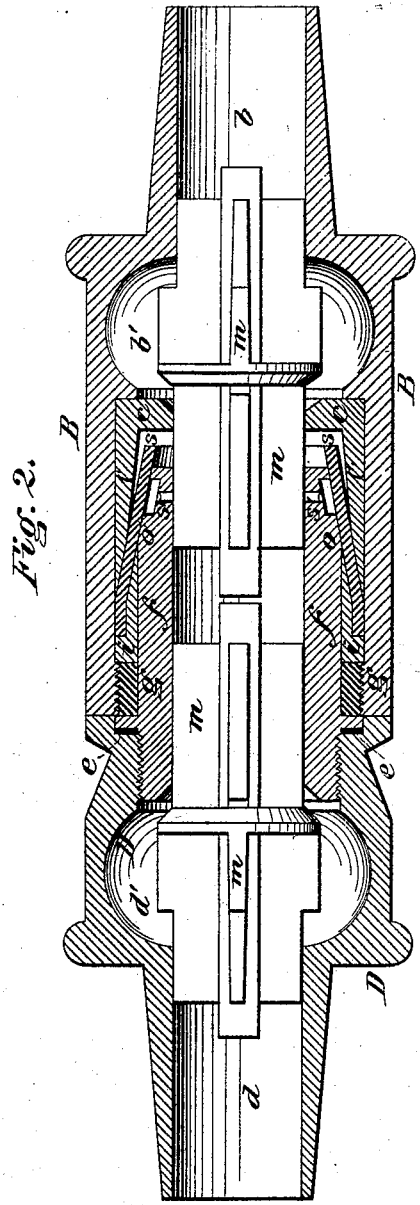
Witnesses.
R. E. Henderson
James J. Kay.
Inventor.
George Westinghouse Jr.
by Bakewell, Christy & Kerr.
his Attys.

UNITED STATES PATENT OFFICE.

GEORGE WESTINGHOUSE, JR., OF PITTSBURG, PENNSYLVANIA.

IMPROVEMENT IN STEAM POWER-BRAKE COUPLINGS.

Specification forming part of Letters Patent No. 136,396, dated March 4, 1873.

*To all whom it may concern:*

Be it known that I, GEORGE WESTINGHOUSE, Jr., of Pittsburg, in the county of Allegheny and State of Pennsylvania, have invented a new and useful Improvement in Steam Power-Brake Couplings; and I do hereby declare the following to be a full, clear, and exact description thereof, reference being had to the accompanying drawing making a part of this specification, in which—

Figure 1 is a longitudinal section of my improved coupling without the valves, and Fig. 2 is a like view of the same with the valves in position.

Like letters of reference indicate like parts in each.

My present improvement, while applicable as a coupling for pipes which are designed for the transmutation of fluids under pressure, is particularly designed for use with the brake-pipes of steam or air railway brakes. It relates to the class of couplings described in Letters Patent granted to me November 29, 1870, and is of substantially the same general form and operation. But by the improvements in construction hereinafter described and claimed, I cheapen considerably the manuracture, and better adapt it for the uses for which it is designed.

To enable others skilled in the art to make and use my improvement, I will proceed to describe its construction and manner of use.

B represents the outer shell of the female part of the coupling. It has the usual thimble $b$, by which connection is made with the hose-pipe and the usual valve-chamber $b'$. Just forward of the valve-chamber $b'$ is an annular shoulder, $a$, against which is seated an annular valve-seat, $c$, from the outer edge of the inner face of which a conical tapering bush, $c'$, projects forward a distance about half way to the inner end of the female-shell B, more or less, the taper or slope being on the inside of the bush. In the inner end of this shell is a screw-ring, $g$, which bears against the base of a tapering or conical counter-bush, $i$, the taper being on the outside of the bush so that the bushes $c'$ and $i$ may overlap each other, or in other words the end of one go inside the end of the other, as shown, but with an annular space between. This space is occupied by a packing-ring, $o$, of India rubber or other suitable material, the inner or forward end of which ring is tightly compressed between the bushes $c'$ and $i$, so as to make at that place a tight joint, and be thereby held securely in its place. At the same time this ring $o$ extends back over the conical end of the male pipe $f$. An open space, $s$, however, is left around and outside of the rear end of the ring $o$. The air, then passing through the pipes under pressure, will exert its full force on the outside of the rear end of the ring, and press it down tightly onto the joint formed by the male pipe $f$ and the bush $i$, thereby securing a perfectly tight packing.

The base D of the male part of the coupling has likewise a thimble, $d$, and valve-chamber $d'$. The tube $f$ which screws into this constitutes the male part proper, and the rear end of this tube constitutes the other valve seat. A tight joint is secured between the male tube $f$ and the base D by means of a gasket, $e$. The forward end of the male tube $f$ is made conical, as shown, and with or without the groove and holes $s'$, as described in the patent above referred to. These couplings are fitted with valves $m\,m$, which unseat each other when the couplings are united, and by the pressure of air are automatically seated, when the couplings are separated, as described in the patent above referred to. The same fastenings as are described in said patent, or other suitable detachable fastenings may also be employed. The parts described may be made of any suitable material, but the screw-ring $g$ and the bushes $i$ and $c'$ are preferably made of brass or other like metal not liable to corrosion. The other parts may be made of cast-iron, whereby the cost of the couplings will be greatly lessened.

The same construction of couplings is applicable to a hydrant hose-pipe and to pipes generally for conveying fluids under pressure, and such use I include in my invention.

What I claim as my invention, and desire to secure by Letters Patent, is—

1. A packing-ring, $o$, arranged in the female part of a coupling, and with one end compressed between the conical tapering faces of the bushes $c'$ and $i$, substantially as set forth.

2. The packing-ring $o$, not only covering but also resting upon the joint formed by the union of the male and female parts, in combination with an opening, port or ports $s$, leading from the main through passage-way to the outer face of the packing-ring, substantially as and for the purposes set forth.

3. A male tube or pipe, $f$, made separate from the male base piece D, and packed at its base end by a gasket, $e$, in combination with the female part, and with the interposed packing, substantially as set forth.

4. The subject-matter of the last preceding claim, in combination with valves $m\ m$, substantially as set forth.

In testimony whereof I, the said GEORGE WESTINGHOUSE, Jr., have hereunto set my hand.

GEORGE WESTINGHOUSE, Jr.

Witnesses:
W. N. PAXTON,
G. H. CHRISTY.